United States Patent
Krasko (10) Patent No.: US 10,733,084 B2
(45) Date of Patent: Aug. 4, 2020

(54) EARLY TEST BREAKAGE DETECTION USING PRESUBMIT RUNS

(71) Applicant: Google LLC, Mountain View, CA (US)

(72) Inventor: Evgenii Krasko, San Mateo, CA (US)

(73) Assignee: Google LLC, Mountain View, CA (US)

( * ) Notice: Subject to any disclaimer, the term of this patent is extended or adjusted under 35 U.S.C. 154(b) by 143 days.

(21) Appl. No.: 15/836,200

(22) Filed: Dec. 8, 2017

(65) Prior Publication Data

US 2019/0179735 A1    Jun. 13, 2019

(51) Int. Cl.
  *G06F 9/44*    (2018.01)
  *G06F 11/36*    (2006.01)

(52) U.S. Cl.
  CPC ........ *G06F 11/3688* (2013.01); *G06F 11/368* (2013.01); *G06F 11/3692* (2013.01)

(58) Field of Classification Search
  CPC . G06F 11/368; G06F 11/3688; G06F 11/3692
  See application file for complete search history.

(56) References Cited

U.S. PATENT DOCUMENTS 9,176,731 B1    11/2015   Ziftci et al.
10,310,968 B2 *  6/2019   Biddle ................ G06F 11/3692

2009/0089755 A1   4/2009  Johnson et al.
2013/0031423 A1   1/2013  Barrow et al.
2017/0286267 A1  10/2017  Jain et al.

OTHER PUBLICATIONS

Christian Macho et al., Automatically Repairing Dependency-Related Build Breakage, IEEE, 2018, retrieved online on Mar. 15, 2020, pp. 106-117. Retrieved from the Internet: <URL: https://ieeexplore.ieee.org/stamp/stamp.jsp?>. (Year: 2018).*

Celal Ziftci et al: "Who broke the build?", Software Engineering, IEEE Press, May 20, 2017 (May 20, 2017) pp. 113-122, XP058339988, DOI: 10.1109/ICSE-SEIP.2017.13 ISBN: 978-1-5386-2717-4.

(Continued)

*Primary Examiner* — Hanh Thi-Minh Bui
(74) *Attorney, Agent, or Firm* — Lerner, David, Littenberg, Krumholz & Mentlik, LLP (57) ABSTRACT

The technology employs a micro-scheduler arrangement to detect and correct issues relating to software code testing. The micro-scheduler uses test results from unsubmitted branches to predict test breakages, test fixes, and to identify which changes have broken certain tests. This arrangement is high beneficial in large-scale software systems that have millions or billions of lines of code, and can be used to supplement an existing test automation platform. In response to receipt of a new presubmit or postsubmit test result, the system evaluates the recent test history in relation to milestone tests in order to determine whether or not to schedule a particular test for one or more change list identifiers. Different test conditions, such as currently failing and currently broken, in conjunction with stored presubmit information, help the system determine the range of changes that could be the culprit for a test breakage.

18 Claims, 6 Drawing Sheets

(56) References Cited

OTHER PUBLICATIONS

John Micco: "The State of Continuous Integration Testing @Google", Mar. 14, 2017 (Mar. 14, 2017), XP055528154, Retrieved from the Internet: URL: http://aster.or.jp/conferencejicst2017 /program/jmicco-keynote.pdf [retrieved on Nov. 28, 2018]. 31 pages.

Atif Memon et al: "Taming google-scale continuous testing", Software Engineering, IEEE Press, May 20, 2017 (May 20, 2017), pp. 233-242, XP058339953, DOI: 10.1109/ICSE-SEIP.2017.16 ISBN: 978-1-5386-2717-4.

Rachel Potvin et al: "Why Google stores billions of lines of code in a single repository." Communications of the ACM, Association for Computing Machinery, Inc, United States, vol. 59, No. 7, Jun. 24, 2016 (Jun. 24, 2016), pp. 78-87, XP058257033, ISSN: 0001-0782, DOI: 10.1145/2854146.

International Search Report and Written Opinion for PCT Application No. PCT/US2018/050684, dated Dec. 13, 2018. 17 pages.

Bland, "Tools", https://mike-bland.com/2012/10/01/tools.html, retrieved from the Internet on Nov. 10, 2017.

Whittaker et al., "How Google Tests Software," www.it-ebooks.info, Addison-Wesley, Mar. 2012.

Potvin et al., "Why Google Stores Billions of Lines of Code in a Single Repository," Communications of the ACM, vol. 59, No. 7, Jul. 2016.

Memon et al., "Taming Google-Scale Continuous Testing," 2017, retrieved from the Internet on Nov. 10, 2017.

Micco, "Intelligent Development at Google," 2017, retrieved from the Internet on Nov. 10, 2017.

Legunsen et al., "An Extensive Study of Static Regression Test Selection in Modern Software Evoluation," FSE '16, Nov. 13-18, 2016, Seattle, WA, USA.

International Preliminary Report on Patentability for International Application No. PCT/US2018/050684 dated Jun. 18, 2020. 10 pages.

* cited by examiner

EARLY TEST BREAKAGE DETECTION USING PRESUBMIT RUNS

BACKGROUND

Corporations and other organization may employ large-scale software systems for different products and services. Certain components or modules for those products and services may be developed independently but have interdependencies. These software systems may contain millions or billions of lines of code. Various platforms can be used to run automated tests to ensure that the code satisfies certain criteria, such as being reliable enough to release commercially.

Testing in this manner may be run periodically, for instance at a milestone such as a certain point in time or at a particular stage of project development. When all tests are passed at the milestone, the organization can have confidence in the tested code. However, if one or more tests are not passed (the code is "broken"), it can be very time consuming and resource intensive to determine the source of the break. This is especially true if multiple changes to the code occurred between milestones, and if the number of interdependencies is large.

BRIEF SUMMARY

Aspects of the technology address such issues with a system that employs a micro-scheduler which uses test results from unsubmitted branches for predicting test breakages, test fixes, and identifying which changes have broken certain tests. Presubmit results for code that has not gone through the formal automated testing process allow the system to infer the post-submit status for given milestone test. This approach, discussed in detail below, leads to resolving breaks earlier and does so in a resource-efficient manner.

According to one aspect a processing system is configured to perform software test breakage detection. The processing system comprises a processing module including one or more processors, a memory module, and a communication module. The memory module is configured to store data and instructions for execution by the one or more processors of the processing module. The memory module is configured to maintain a representation of recent test history for each combination of a test and build flags with which the test was built. The communication module is configured for communication with one or more remote devices including a test automation platform server. The processing module is operatively coupled to the memory module and the communication module, and is configured to receive at least one of a new postsubmit result or a new presubmit result from the test automation platform server, insert the least one of the new postsubmit result or the new presubmit result into the memory, evaluate the recent test history according to the inserted at least one of the new postsubmit result or the new presubmit result to determine a cause of a breakage of the test, and, in response to the evaluation, instruct a test automation platform rescheduler to reschedule the test for a set of change list identifiers associated with the cause of the breakage.

In one example, the processing module is configure to evaluate the recent test history by obtaining the set of change list identifiers that affected the test from the memory module and assess a last known postsubmit state of the test. Here, the last known postsubmit state of the test may be one of: no results known, currently passing, currently failing, or currently broken. In another example, the evaluation by the processing module includes retaining, for further analysis, only a latest result from each unsubmitted change. In this case, the evaluation by the processing module may further include rounding down a base change list number of each unsubmitted change to a number of a previous change that affected the test.

In a further example, the processing module is configured to instruct the test automation platform rescheduler to reschedule the test by scheduling one test run at a latest change that affected the test, scheduling test runs at all changes after a given change with a last known postsubmit result, or scheduling one or more test runs in a range between a last change at which the test passed on presubmit or on postsubmit, and a first change at which the test failed on presubmit. In yet another example, when the latest known postsubmit state is currently failing or currently broken and there is no identified culprit of the breakage, the processing module is configured to use stored presubmit results to determine a range of changes to indicate a culprit of the breakage.

According to another example, when the latest known postsubmit state is currently passing, the processing module is configured to analyze stored presubmit results. Here, when there is a selected number of currently failing or currently broken presubmit results having a base changelist number greater than a base changelist number of a latest known postsubmit result, the processing module is configured to instruct the test automation platform server to reschedule the test in order to detect a culprit of the breakage.

In a further example, the memory module includes an in-memory grid configured to maintain the representation of recent test history for each combination of a test and build flags with which the test was built. The processing module may be configured to instantiate one or more in-memory grid server elements for the in-memory grid, one or more instances of a dashboard user interface for presentation of test information to a user, and a presubmit rescheduler configured to instruct the test automation platform rescheduler to reschedule the test. The in-memory grid may be arranged so that each data point is stored in 8 bytes. And the in-memory grid may be configured as an array of shards.

According to another aspect of the technology, a computer-implemented method for performing software test breakage detection is provided. The method comprises receiving, by one or more processors of a processing system, at least one of a new postsubmit result or a new presubmit result from a test automation platform server; inserting, by the one or more processors, the least one of the new postsubmit result or the new presubmit result into memory of the processing system, the memory being configured to maintain a representation of recent test history for each combination of a test and build flags with which the test was built; evaluating, by the one or more processors, the recent test history according to the inserted at least one of the new postsubmit result or the new presubmit result to determine a cause of a breakage of the test; and, in response to the evaluation, the one or more processors instructing a test automation platform rescheduler to reschedule the test for a set of change list identifiers associated with the cause of the breakage.

In one example, evaluating the recent test history is performed by the one or more processors by obtaining the set of change list identifiers that affected the test from the memory and assessing a last known postsubmit state of the test. In another example, the evaluating further includes rounding down a base change list number of each unsubmitted change to a number of a previous change that affected the test.

According to a further example, the instructing to reschedule the test includes instructing the test automation platform reschedule to perform scheduling one test run at a latest change that affected the test; scheduling test runs at all changes after a given change with a last known postsubmit result; or scheduling one or more test runs in a range between a last change at which the test passed on presubmit or on postsubmit, and a first change at which the test failed on presubmit. In another example, when the latest known postsubmit state is currently failing or currently broken and there is no identified culprit of the breakage, the method includes using stored presubmit results to determine a range of changes to indicate a culprit of the breakage.

And in yet another example, the method includes analyzing stored presubmit results when the latest known postsubmit state is currently passing; and, when there is a selected number of currently failing or currently broken presubmit results having a base changelist number greater than a base changelist number of a latest known postsubmit result, instructing the test automation platform server to reschedule the test in order to detect a culprit of the breakage.

According to a further aspect of the technology, a non-transitory computer-readable recording medium is provided having instructions stored thereon. The instructions, when executed by one or more processors, cause the one or more processors to perform a method for performing software test breakage detection. The method comprises receiving at least one of a new postsubmit result or a new presubmit result from a test automation platform server; inserting the least one of the new postsubmit result or the new presubmit result into memory associated with the one or more processors, the memory being configured to maintain a representation of recent test history for each combination of a test and build flags with which the test was built; evaluating the recent test history according to the inserted at least one of the new postsubmit result or the new presubmit result to determine a cause of a breakage of the test; and in response to the evaluation, instructing a test automation platform rescheduler to reschedule the test for a set of change list identifiers associated with the cause of the breakage.

In one example, when the latest known postsubmit state is currently failing or currently broken and there is no identified culprit of the breakage, the method includes using stored presubmit results to determine a range of changes to indicate a culprit of the breakage.

BRIEF DESCRIPTION OF THE DRAWINGS

Accompanying this specification is a set of drawings illustrating various features and aspects of the technology. In the drawings, like reference numerals refer to like elements. A brief discussion of each drawing is provided below.

The following description is based on embodiments of the claims and should not be taken as limiting the claims with regard to alternative embodiments that are not explicitly described herein.

DETAILED DESCRIPTION

Overview

When there is a very large code base, for instance hundreds of millions or billions of lines of code, a test automation platform can be used to run millions of automated tests on the code periodically. Such automated tests may be run daily, or more or less often, in order to validate the code. This approach may employ the notion of a build dependency as a preliminary filter for determining what tests should be run after a given change to the codebase. Each change may be assigned a unique change list identifier ("CL identifier"). Here, the only those tests which need to be run are those that are affected, in particular those that have a declared transitive dependency on the files or routines that have been changed. Such an approach generally works quite well because tests should be hermetic. This means that the outcome of the tests should depend only on the code under test and should not have any other dependencies, including time of the execution, external storage systems, etc. However, this may not always be the case and test errors may occur even though there is nothing wrong with the code.

Furthermore, using build dependencies typically results in huge numbers of tests that need to be run in order to validate each change to the codebase. Running all such tests could result in overloading the processing system, take extensive amounts of time, or require additional servers and storage, which would add significant cost and complexity. To address these testing issues, a just-in-time scheduler may be used that chooses a milestone change from time to time. Here, the just-in-time scheduler runs all tests that were affected between the current milestone and the previous milestone. This ensures that milestone changes are fully tested, whereas intermediate changes may skip test runs. When all tests in a given milestone are passed, that is considered a "green milestone". The engineering or software development team associated with the tested code can then rely on the green milestone to build binary files and deploy the software.

Figure 1:
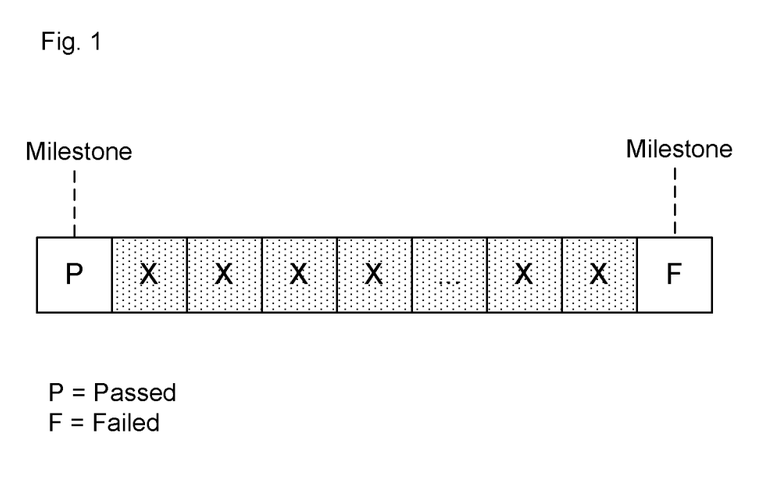
FIG. 1 illustrates an example of a code failure or break between two milestones.

However, one concern is whether a test is broken between milestones. Should this occur, it may not be immediately clear which of the intermediate changes broke it, as the range between milestones contains skipped test runs. FIG. 1 illustrates an example 100 of such a break. As shown, at a first milestone on the left side, the test(s) passed as indicated by the "P". But at the next milestone to the far right, at least one test failed as indicated by the "F". In between the two milestones, one or more parts of the codebase were changed and could have been the cause of the failure. Alternatively, the changes may be fine but the test failure is due to some other issue.

Finding the cause of a test breakage (especially if it is due to a code change) and resolving it quickly would help development and product teams move faster and more efficiently. One way to do this is by rescheduling certain tests to confirm the cause of the breakage/failure. Micro-schedules can also be used to predict at which change a test failure has happened or is likely to happen. In one approach, a micro-scheduler finds test breakages by running the test on all changes between the last change where the test passed and the first change where the test failed. However, this may be difficult to implement given the sheer volume of processing power and other resources required for many tests.

Resolving breakage issues may involve one or both of manual and automated review and analysis, and may include rolling back a code change, fixing tests or otherwise disabling tests. Part of the resolution may try to figure out whether a test was "flaky", which means that the issues is non-deterministic, i.e., not caused by any change. Flaky tests may be fixable by simply retrying the tests. In some instances, most broken tests may be due to flaky issues and not to coding issues.

The amount of time and resources devoted to such testing procedures can be massive, from both a team perspective and a computational and resource perspective. Thus, the technology disclosed herein provides an enhanced approach that is time and resource efficient, which improves the overall operation of the system. Aspects include a test micro-scheduler that uses test results from unsubmitted branches for predicting test breakages, test fixes, and identifying which changes break tests. These and other aspects of the technology are further described below.

Example Arrangement

Figure 2:
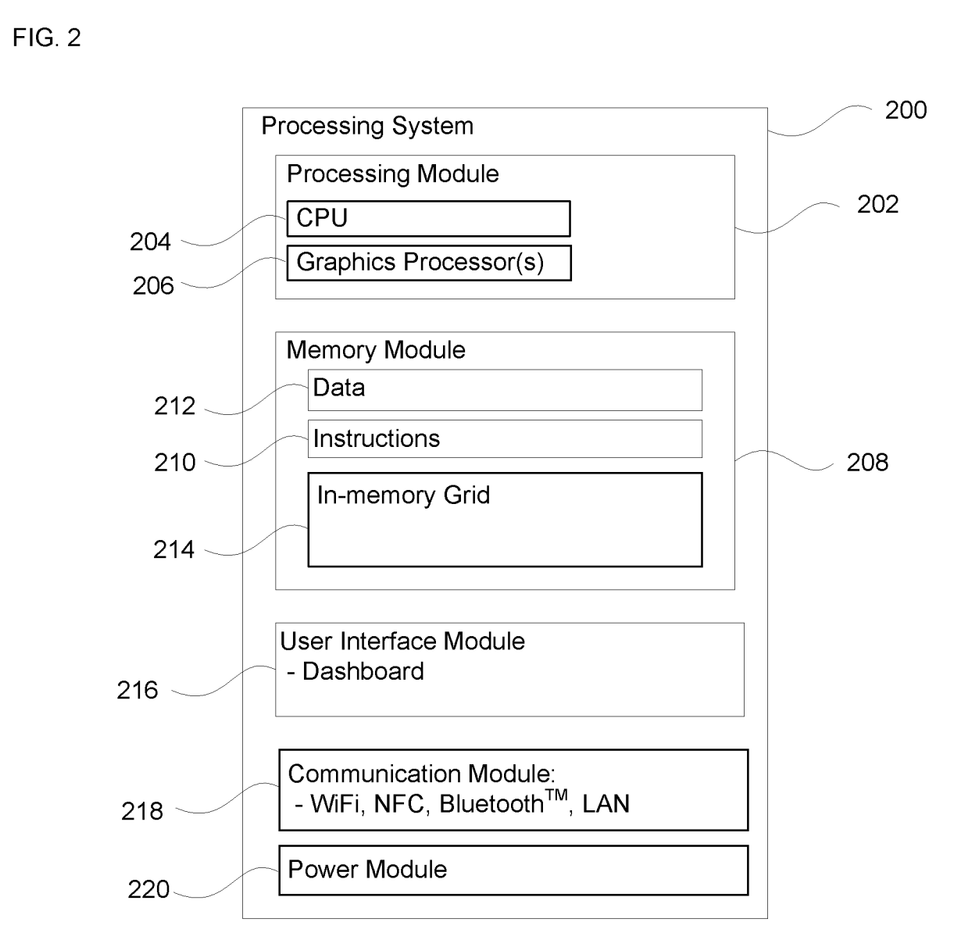
FIG. 2 is an example processing system configured to implement early test breakage detection using presubmit runs in accordance with aspects of the disclosure.

FIG. 2 illustrates an example processing system 200, such as a server, that may be employed with the techniques disclosed herein. As shown, the processing system 200 includes a processing module 202 having one or more computer processors such as a central processing unit 204 and/or graphics processors 206, as well as memory module 208 configured to store instructions 210 and data 212. The processors may or may not operate in parallel, and may include ASICs, controllers, multi-core processors and other types of hardware circuitry.

Memory module 208 can be implemented as one or more of a computer-readable medium or media, a volatile memory unit or units, or a non-volatile memory unit or units. The memory module 208 may include, for example, flash memory and/or NVRAM, and may be embodied as a hard-drive or memory card. Alternatively the memory module 208 may also include DVDs, CD-ROMs, high-density tape drives, and other types of write-capable or read-only memories. In one implementation, a computer program product is tangibly embodied in an information carrier. The computer program product contains instructions, such as the instructions 210 that, when executed by one or more processors, perform methods such as those described herein. The information carrier is a computer- or machine-readable medium, such as memory module 208. Although FIG. 2 functionally illustrates the processor(s), memory module, and other elements of processing system 200 as being within the same overall block, such components may or may not be stored within the same physical housing. For example, some or all of the instructions and data may be stored on an information carrier that is a removable storage medium (e.g., optical drive, high-density tape drive or USB drive) and others stored within a read-only computer chip.

The data 212 of memory module 208 may be retrieved, stored or modified by the processors in accordance with the instructions 210. For instance, although the claimed subject matter is not limited by any particular data structure, the data may be stored in computing device registers, in a relational database as a table having a plurality of different fields and records, XML documents or flat files. The data may also be formatted in any computing device-readable format.

The instructions 210 may be any set of instructions to be executed directly (such as binary machine code) or indirectly (such as scripts) by the processor(s). For example, the instructions may be stored as computing device code on the computing device-readable medium. In that regard, the terms "instructions" and "programs" may be used interchangeably herein. The instructions may be stored in object code format for direct processing by the processor(s), or in any other computing device language including scripts or collections of independent source code modules that are interpreted on demand or compiled in advance. Functions, methods and routines of the instructions are explained in more detail below.

By way of example, the processors of the processing module 202 may be arranged in a distributed architecture. In a distributed architecture, the processing system 200 may comprise multiple server units, for instance in a cloud computing arrangement. Whether in an inclusive or distributed architecture, the processors are operatively coupled to the memory module 208. As shown, the memory module 208 includes an in-memory grid 214. This in-memory grid, such as a memory cache, maintains a representation of recent test history for each combination of a test and build flags which the test was built. This is discussed in more detail below.

While the in-memory grid 214 is shown as a single block in FIG. 2, the information maintained in the grid may be stored in multiple discrete elements. These elements may be distributed, for instance across multiple memory modules or other storage devices of a cloud computing architecture.

As also shown in FIG. 2, the processing system 200 a user interface module 216. The user interface module may generate data, reports and other information for presentation to a user. For instance, the user interface module may create a dashboard that enables a user to quickly determine whether and where a break occurred, providing a history of test executions, and indicate other test-related information. In one example, the dashboard may provide a project view and a target view. The project view presents all tests for a given project or set of projects. And the target view shows detailed results for a target of interest. Aspects of the dashboard and related information are discussed in more detail below.

The processing system 200 also includes a communication module 218 for communicating with other devices and systems, including with client devices and other elements in the network. The communication module 218 may include a wireless transceiver and a wired transceiver in addition to or in place of the wireless transceiver. The processing system 200 may communicate with other remote devices via the communication module 218 using various configurations and protocols, including short range communication protocols such as near-field communication, Bluetooth™, Bluetooth™ Low Energy (LE), or other ad-hoc networks, the Internet, intranets, virtual private networks, wide area networks, local networks, private networks using communication protocols proprietary to one or more companies, Ethernet, WiFi and HTTP, and combinations of the foregoing. In addition, the processing system 200 as shown includes a power module 220 for providing power to the other elements of the system.

Figure 3:
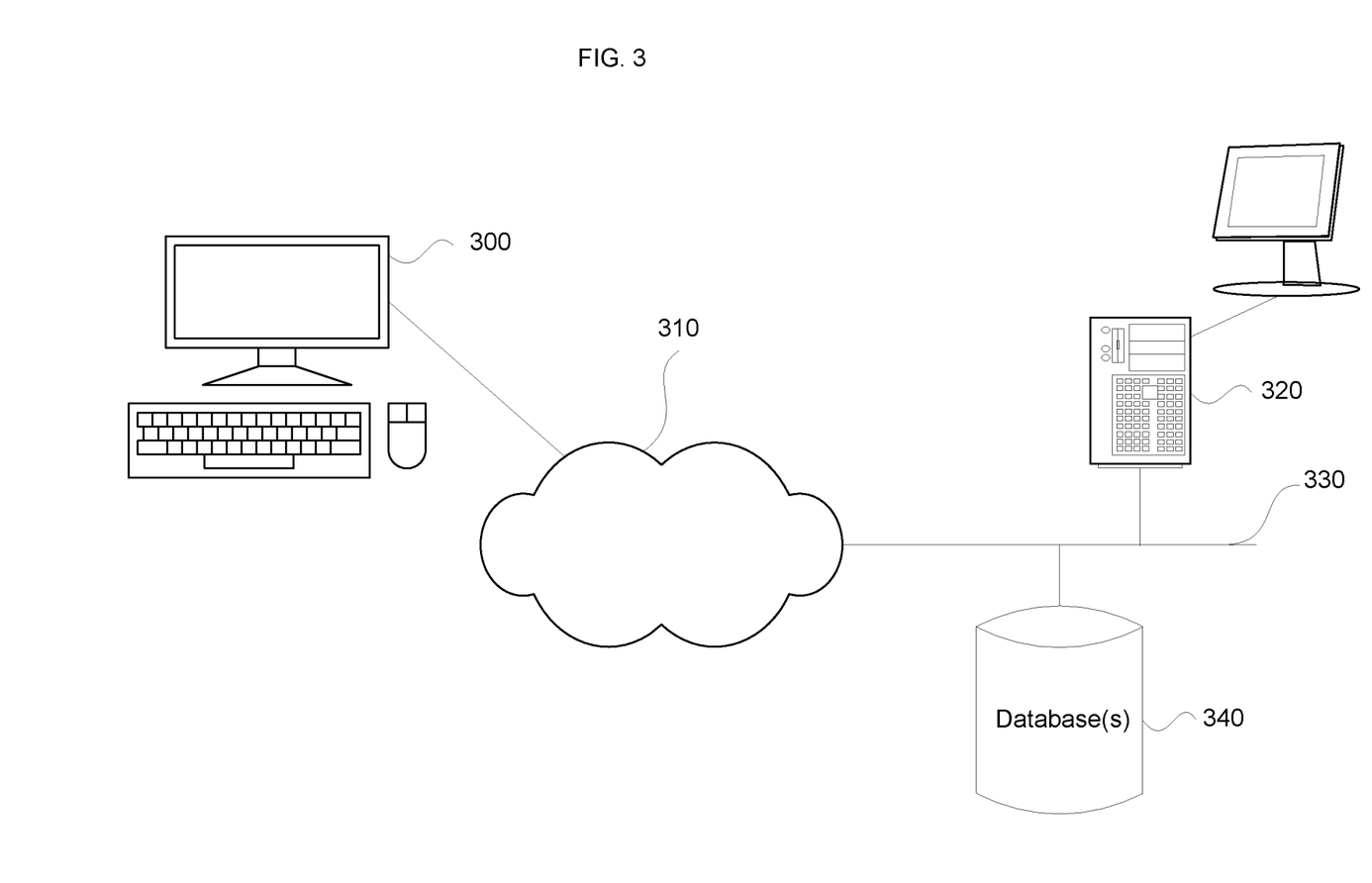
FIG. 3 illustrates an example network in accordance with aspects of the disclosure.

FIG. 3 illustrates an example arrangement in which a processing system 300 may request test or build data or other information from a server 320 via communication system 310. The processing system 300 may include some or all of the components discussed above with regard to processing system 200. By way of example only, the processing system may obtain test and build information from server 320, which retrieves the information from a database 340 via bus 330. While only one server 320 and one database 340 is shown, multiple servers and databases may be used by the code testing system.

Example Methods and Use Cases

Example processes and use cases for implementing features of the technology are discussed below.

Test results that are issued by a test automation platform are provided to the system, which may be implemented as a processing system 200 or 300 discussed above. These test results include postsubmit results and presubmit results. Postsubmit results reflect the state of the test in the repository, such as databased 340 of FIG. 3. Each postsubmit result is attributed to a certain CL identifier. Each CL identifier is associated with a code change that is part of the codebase stored in the repository.

Presubmit results are the results of running tests against changes not yet submitted to the repository. These runs may typically be used to validate an unsubmitted change before submission to the respository. Each presubmit result is attributed to two changes. The first is the unsubmitted one for which the test ran. The second is a base change (base CL) number, which is the number of a submitted change that the pending change was synced to. That essentially means that the tests ran against the codebase at the base CL plus a small delta (set) of files that were modified in the unsubmitted change.

As noted above with regard to FIG. 2, the processing system maintains an in-memory representation of recent test history for each combination of a test and build flags with which the test was built. The time window for the recent test history may be selected based on various implementation factors. In one example, this time window may be on the order of 6 hours. In another example, it may be at least 2 hours. And in a further example, it may be no more than 8 hours. The representation desirably includes a list of CL identifiers that affected the test in this time window, known postsubmit test results for these CL identifiers, and a list of presubmit test results, each of which is characterized by the unsubmitted change number, the base change number and the test result.

Whenever a new postsubmit or presubmit result arrives, for instance from server 320 of FIG. 3, it is insert in into the in-memory grid. The processing system then re-evaluates the recent test history in order to determine whether or not to schedule a particular test for one or more CL identifiers. This evaluation includes obtaining the list of CL identifiers that affected the test from the storage and assessing the latest known postsubmit state of the test. The last known state is one of the following: no results known, currently passing, currently failing, and currently broken. Currently broken means that the test binary cannot compile.

The currently failing and currently broken conditions may be characterized by some additional properties. These properties include whether or not there is at least one test pass in the history. For instance, if there is at least one test pass, does the transition from pass to fail/broken have a clear culprit, e.g., a specific CL identifier associated with a piece of suspect code? Also, did it happen in two consecutive changes or were there a number changes in between that affect the test but have no results? This may be important to help the system determine when to schedule runs to find the culprit in the most optimal way. Other properties include the likelihood that the failure is flaky. If so, this may be fixable by simply retrying the test. This property may be computed by various mechanisms, e.g., a statistical inference from historical results.

The reevaluation process may also include retaining, for further analysis, only the latest result from every unsubmitted change. This would be important for all changes to have equal weight, independent of the number of test runs at that change. And reevaluating may further include rounding down each base change list number of each unsubmitted change to the number of the previous change that affected the test. This would be done as part of attributing the result (and break) to that submitted change.

Based on the presubmit results, the system determines the action that should be taken. For instance, when the latest known postsubmit status is passing, the system has a certain threshold, for the number of observed presubmit failures after that change with the latest status, to conclude that the test is now failing. Here, depending on available resources, the system may schedule either one run at the latest change that affected the test, or schedule test runs at all changes after the one with the last known postsubmit result, or anything in between one run and all runs. In one example, the system schedules the test in the range between the last change at which it passed on presubmit or postsubmit and the first change at which it failed on presubmit.

When the latest known postsubmit status is failing/broken, the system has a threshold for the number of observed passes to conclude that the test is now passing. Here, the system may do the opposite of what is described above when the last known postsubmit status is passing.

When the latest known postsubmit status is failing/broken and there is no identified culprit, the system uses presubmit results to determine the range of changes which could be a culprit of the breakage. In one example, the system takes the range between the last postsubmit pass and the first postsubmit fail/broken, and then shrinks the range using presubmit results. This is done from the change to which the last passing presubmit was attributed, to the change to which the first failing/broken presubmit was attributed. Then the system schedules the test to run for changes in the obtained range to locate the exact culprit.

Figure 4:
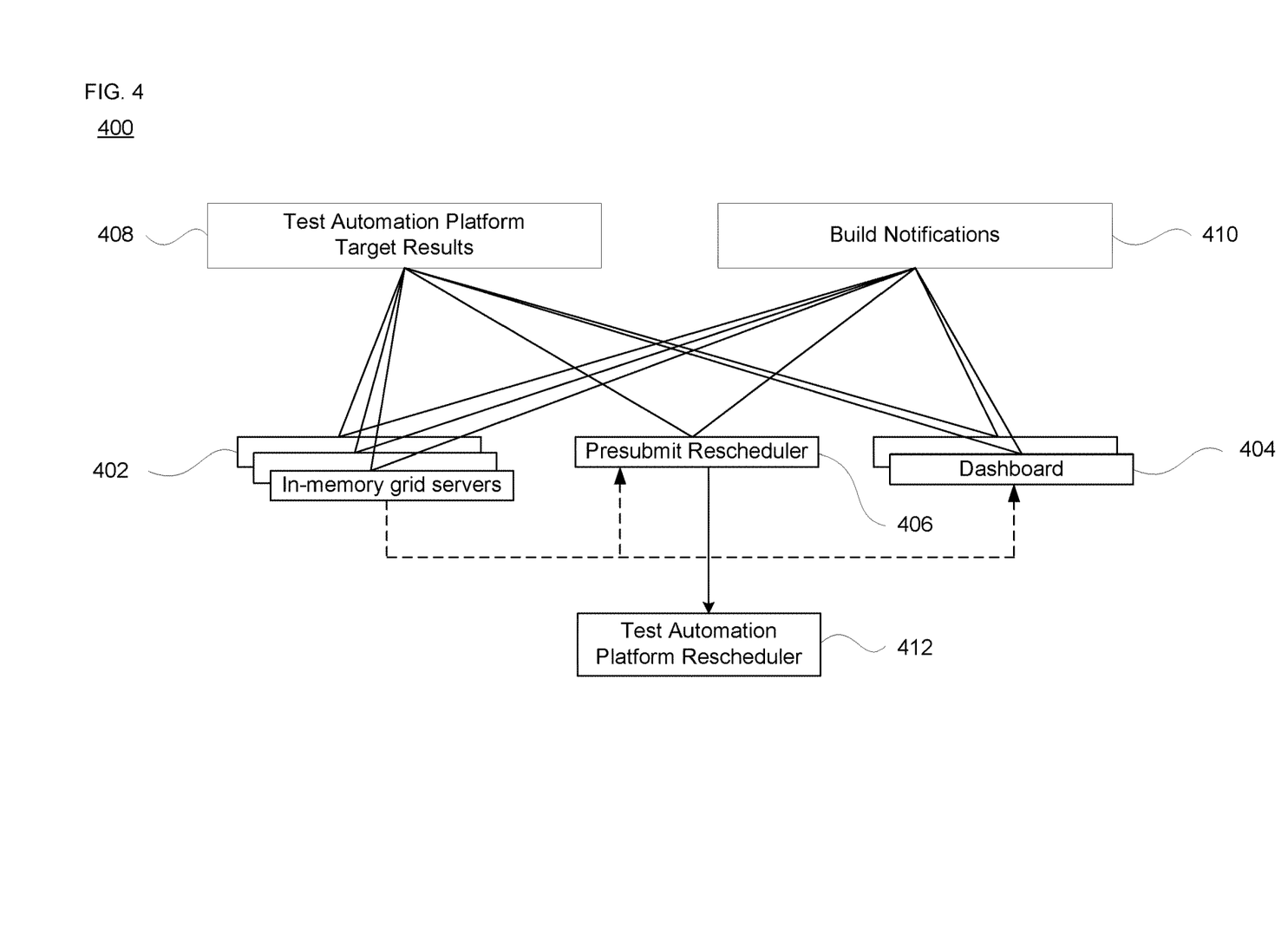
FIG. 4 illustrates an example logical architecture in accordance with aspects of the disclosure.

FIG. 4 illustrates a logical architecture 400 for implementing aspects of the technology. As shown, the architecture includes one or more in-memory grid server elements 402 associated with the in-memory grid (see 214 of FIG. 2), one or more instances of a dashboard 404, and a presubmit rescheduler 406. These may be considered instances of different modules run by the processing system. As shown, each of these modules couples to a test automation platform target results module 408 and a build notifications module 410. The modules 408 and 410 may represent links to one or more external servers, such as server 320 of FIG. 3.

The presubmit rescheduler 406 also couples to a test automation platform rescheduler 412. The dashed lines between the one or more in-memory grid server elements 402, the one or more instances of the dashboard 404, and the presubmit rescheduler 406 indicate that there is at least temporary communication between them, for instance upon module startup. Once startup occurs and jobs from the dashboard 404 and the presubmit rescheduler 406 sync their state with the in-memory grid server elements 402, the jobs may close these connections and focus on receiving information from the test automation platform target results module 408 and the build notifications module 410.

As noted above, the in-memory grid maintains a cached representation of pre- and postsubmit target histories for a selected period of time, such as the past few hours. This representation provides the following benefits. It lets the code access new results of presubmit and postsubmit invocations instantly after they appear on the corresponding streams provided by the test automation platform target results module 408 and the build notifications module 410. The in-memory grid stores the history for every target and flag combination since a last "green" postsubmit occurrence.

This may be done unless the last green postsubmit exceeds a threshold and is considered too old to be reliable or relevant. In one example, this may be than 6 hours, although the threshold time may be longer or less than this.

The in-memory grid also stores some target history from prior to the last green postsubmit test. This makes it possible to automatically filter out or manually spot (e.g., via the dashboard) very flaky targets. And the in-memory grid is robust to process crashes and restarts, and to recover the internal state(s) from other instances of the grid server elements.

In one scenario, the in-memory grid server elements may be implemented as a library that comes together with all the necessary clients to keep their state up-to-date. Each server in a pool of in-memory grid server elements may be implemented as a thin wrapper around the in-memory grid. This enables new jobs storing an in-memory grid to quickly load target history and start in a state that they would have if they were already previously running, e.g., for a few hours. When an in-memory grid server element restarts, such as after a crash or after a package update, it loads the grid from other running in-memory grid server elements.

While the specific configuration of the in-memory grid may be system and resource dependent, it should be configured to provide access to the recent target history for the entire code base at a high rate. In one example, this would be at least 300,000 target-hours of history per second, which would enable the system to scan 6 hours of history for 3 million targets in approximately one minute.

Furthermore, the in-memory grid should be configured to scale together with the code base and the test automation platform. Thus, in one example the in-memory grid server elements include 128 GiB RAM and 48 cores. According to one approach, the in-memory grid has a 10× safety factor, which means that a job storing an in-memory grid should not consume more than 12.8 GiB RAM and 4.8 CPU while in operation.

According to one example, in order to store the millions of data points associated with target results for the selected period of time, each data point needs to be of limited size. Thus, to fit that information into 12.8 GiB memory, each data point would need to consume not more than 16 bytes of data. Since heap memory fragmentation, data structures used for storage, auxiliary code and other data add to memory consumption, in one example the in-memory grid is arranged so that each data point is stored in 8 bytes. However, fewer or more than 8 bytes may also be employed.

Another factor to consider is the time needed for a job to start. Depending on the specific arrangement, a starting job may need to load the whole grid from a different job, and that could be a massive amount of data. It is possible to transfer 12.8 GiB over an 1 Gib/s wire within a datacenter in about 100 seconds, which in one example is the desired start time. Starting quickly can be important, for instance, because the modules 408 and 410 may have a limited size for unacknowledged messages. If a job goes down for any reason, messages will begin go pile up. The job needs to start, load the state and apply these messages on top of it to not lose any data, all within the desired start time (e.g., 100 seconds).

The in-memory grid itself may logically be arranged as a mapping from pairs (build target, build flags) to structures holding presubmit and postsubmit history for these target-flags combinations. The history stores only changelists (e.g., CL identifiers), target results, and optionally hash keys for deduplication.

Physically, the in-memory grid may be configured as an array of shards. A Go-like pseudocode representation is:

```
type shard map[interned.FlagsAndTarget]*TargetResults
type interned.FlagsAndTarget struct {
  Flags *string
  Target *string
}
type TargetResults struct {
  Presubmits, Postsubmits Row
}
type Row [ ]Cell
type Cell uint64
```

Target history is split into shards so that each shard can be locked individually, providing fast parallel access. Target to shard mapping may be defined via a pure function of the target name. Each target results object maps stores the history for presubmit and postsubmit runs in a "row", which is a slice of cells. Cells are stored, for example, as 8-byte integers. By way of example, each cell stores a 32-bit CL identifier, a 16-bit target status and a 16-bit hash key. Flags may be stored encoded as strings. According to this scenario, each flag combination and each target name is stored only once, and maps only hold references to canonical objects to save memory and compare them quickly.

A CL identifier is a submitted changelist number for a postsubmit run and a base changelist number for a presubmit run. A key is a 16-bit integer hash value. No two cells in a row share the same key. For presubmits, the key is determined by the pending CL identifier. Here, the in-memory grid should store only 1 result per client (job); otherwise running a presubmit over and over again from the same "bad" CL identifier may introduce unwanted imprecision in target result estimates. For postsubmits, the key represents the number of the submitted CL identifier.

With the arrangement as described, the processing system is capable of performing one billion operations a second and processing 150,000 targets a second. If one conversion of one 8-bit target result is performed in 100 cycles, the system can thus process 10 million target results per second. For a large project with 30,000 targets and 100 target results of history on both pre- and post-submit, that means the system will be able retrieve the history in one third of a second. That rate enables the user interface module to instantiate dashboards for multiple users while providing real-time data for which the user can act on.

The dashboard 404 instances shown in FIG. 4 are part of the user interface that are presented to one or more users of the system. The dashboard enables the users to monitor builds through a web browser or other graphical user interface. And the presubmit rescheduler 406 module is configured to reschedule targets failing on multiple presubmits to check their postsubmit status earlier than would otherwise be possible with a simple milestone to milestone approach.

According to one aspect of the technology, the dashboard enables the user to see the history of test executions for a moderately long time period, such as at least the past 4 hours (or more or less). For failing tests, this period might be extended, such as to 6 or 8 hours or more. In one scenario, two views of the dashboard may be implemented. One is a project view that shows all tests for a project (or a set of projects) on the same page in a form of a matrix. The other is a target view, which shows the results for one target in a more detailed form.

Figure 5:
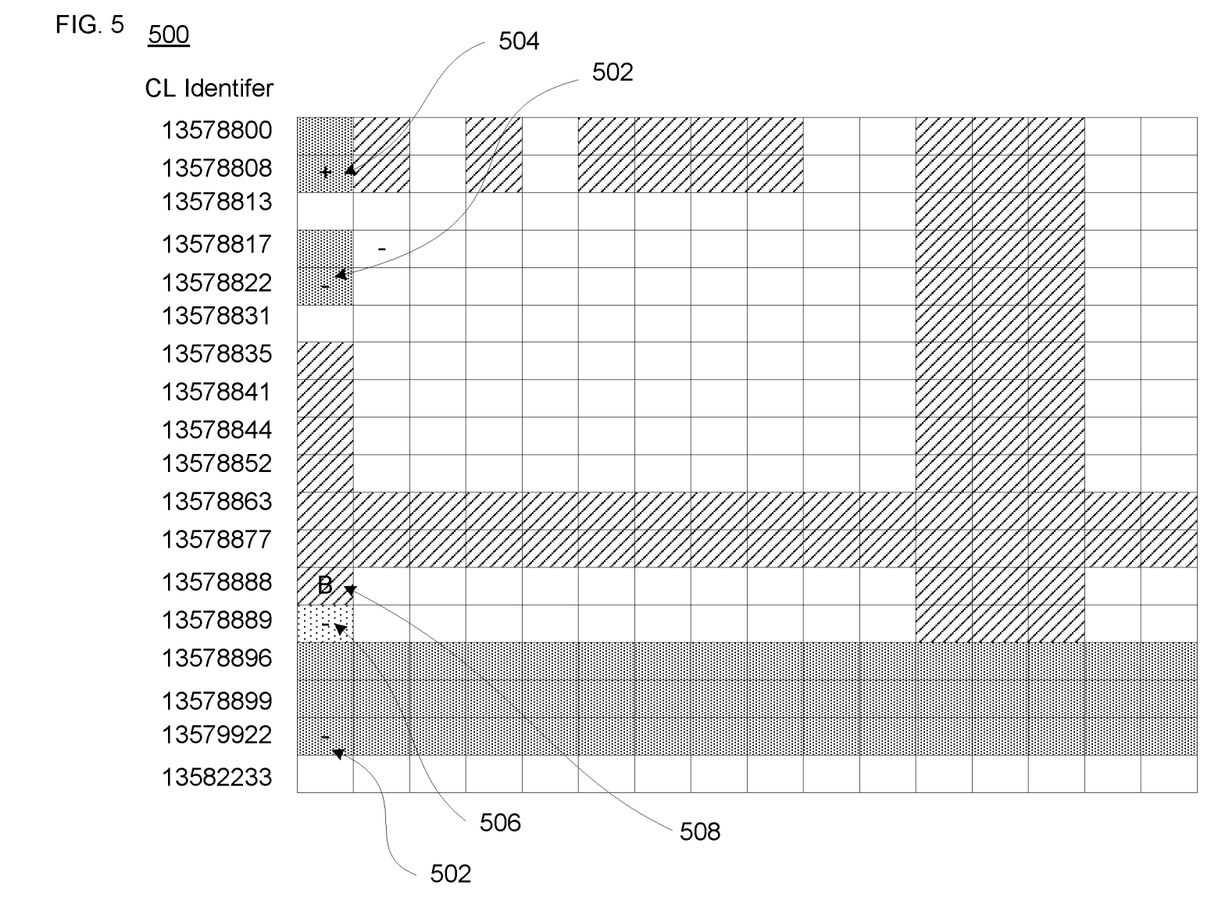
FIG. 5 is an example dashboard user interface in accordance with aspects of the disclosure.

An example dashboard project view 500 is illustrated in FIG. 5. This project view shows the data for multiple projects. The leftmost column indicates the CL identifiers under consideration. The grid visually presents information based on the above techniques to indicate different status information. Users may want to monitor multiple projects at the same time, for instance if a release is gated on multiple projects. Target and flag combinations common across projects may be merged.

In one example, the dashboard may indicate presubmit results and culprit results as hints, for instance using light colors for the corresponding cells of the view. The dashboard allows the user to sort and show the top targets according to different criteria, such as failure probability, flakiness, and delay. In the figure, references 502 indicate that a "passing" status is inferred from the presubmit results. Reference 504 indicates a first known pass based on a postsubmit result. Reference 506 indicates a new affected change list with no data available. In this scenario, this change list may be the culprit. And reference 508 indicates a first known breakage on postsubmit.

In the target view, the dashboard may show all the known results in a non-merged way, for instance listing all presubmit, culprit finder and postsubmit runs plus the corresponding CL identifiers. This helps users to see where presubmit started failing even if it may be unclear at the moment which CL identifiers were affected. In some cases the culprit change list is clear from analyzing the history of CL identifiers for the folders neighboring with the one where the failing test is located. Thus, the dashboard allows one or more users to monitor the status of continuous builds. It uses heuristics like aggregation of presubmit runs to detect test breakages earlier and show users the relevant tests for further evaluation.

The system uses presubmit runs to detect test breakages earlier than previously possible. The system described herein also can use the same approach to detect test fixes earlier and turn the project status to green more rapidly than previously. This again aids users by streamlining and simplifying the amount of information to consider, and reduces the time required to move forward with code releases. Similarly, the dashboard is able to quickly notify authors of CLs breaking tests about these breakages. This allows the author(s) to make necessary changes to the code.

The presubmit rescheduler is able to store an in-memory version of a test automation platform grid with presubmit results and use it to do earlier and more efficient breakage detection/culprit finding than would otherwise be possible. The rescheduler may be built on a rough model of a behavior of a given test based on only a few (e.g., 50-60) executions. This model may include the following parameters involving flakiness and the probability of failing on presubmit if postsubmit is passing.

Regarding flakiness, in one example a naive pass-fail-pass heuristic to count flakes allows the system to estimate the flakiness for very flaky tests, e.g., more than 10-20% flaky. For less flaky tests the model may pessimistically assume they are, e.g., 5% flaky. Thus, under this assumption one postsubmit failure will not trigger an alarm. However, two postsubmit failures with no single pass-fail-pass before that in, e.g., approximately 30 runs, is already a strong signal to reschedule a test. This may be done by the presubmit rescheduler instructing the test automation platform reschedule to initiate a reschedule.

Regarding the probability of failing on presubmit if postsubmit is passing, some tests may run with different flag combinations. For most such tests all combinations may either all pass or all fail together. However, there may be tests that fail under one combination but pass under a different combination. The presubmit rescheduler comparing past presubmits with past postsubmits may help to identify such tests. Here, the presubmit rescheduler may instruct the system to postpone rescheduling those tests until subsequent runs produce a stronger passing signal.

In one scenario, the presubmit rescheduler evaluates new test results appearing in the grid, and on each new result retrieves the corresponding test history from it. Then the presubmit rescheduler can build the model for this test and compare the probabilities of a flake, a real breakage and a false alarm from presubmits. The model may be constructed in a "naïve" way, for instance by computing a few empirical probabilities using arithmetic.

If the real breakage probability wins, the presubmit rescheduler would reschedule the test. The set of CL identifiers to reschedule may be chosen naively. For instance, all affected CL identifiers from the last green pre/postsubmit to the first "red" (failure) pre/postsubmit could be rescheduled.

Even if this approach fails, results from reschedulers will provide a shorter possible culprits range and culprit finding will continue. The core principle is that for tests that are not extremely flaky, the breakages should be rescheduled anyway, as soon as the system is confident enough that the breakage is real.

The presubmit rescheduler may also be employed as a deflaker, where passing presubmits would serve as a signal that a target is in fact passing at a given CL identifier and just needs to be triggered again.

Figure 6:
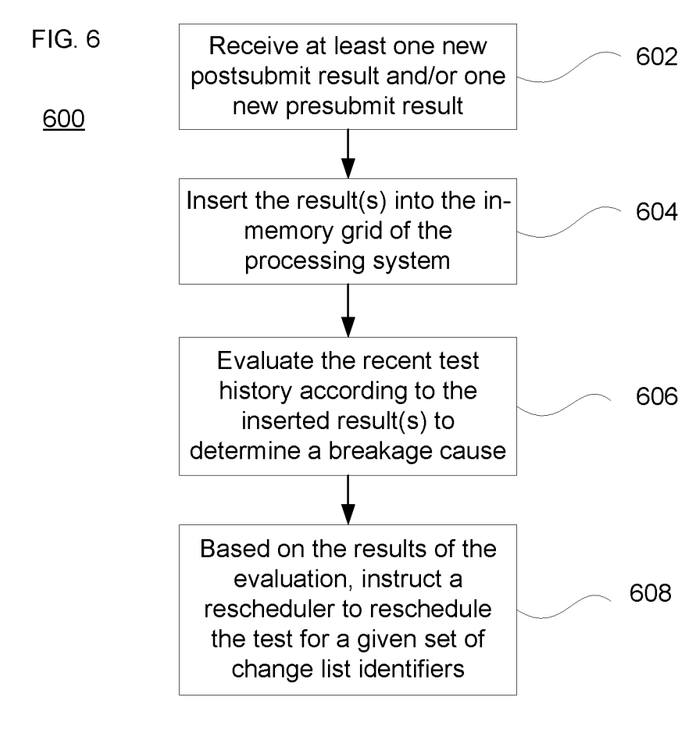
FIG. 6 illustrates a process for presubmit evaluation in accordance with aspects of the disclosure.

Turning next to FIG. 6, this figure provides a flow diagram 600 for certain operations of the processing system. In particular, it illustrates a method for performing software test breakage detection. As shown in block 602, the process includes receiving, by one or more processors of the processing system, at least one of a new postsubmit result or a new presubmit result from a test automation platform server. This information may be received from the modules 408 and 410 of FIG. 4. Next, at block 604, the at least one of the new postsubmit result or the new presubmit result is inserted into an in-memory grid of the processing system, such as in-memory grid 214 of FIG. 2. As discussed above, the in-memory grid is configured to maintain a representation of recent test history for each combination of a test and build flags with which the test was built. At block 606, the recent test history is evaluated by the processors of the processing system according to the inserted at least one of the new postsubmit result or the new presubmit result to determine a cause of a breakage of the test. Here, the system may differentiate breakages from flaky operation or other issues. Then in response to this evaluation, at block 608 the one or more processors are configured to instruct a test automation platform reschedule, such as reschedule 412 of FIG. 4, to reschedule the test for a set of change list identifiers associated with the cause of the breakage. This may be done by presubmit rescheduler 406.

Thus, it can be seen that the approach uses the presubmit results to infer the postsubmit status for the test being evaluated. If a test is failing/broken, this is a significant blocker to developer productivity. The impact of this is, in particular, reflected in failing presubmit runs that may confuse developers and make them do an investigation of whether or not their changes broke the test or it has already been broken at the base change list. An important advantage of test scheduler discussed herein is that it uses each such presubmit test run as a signal for prioritizing postsubmit test runs. Thus, tests that fail on presubmit more frequently get prioritized earlier and hence the breakage can be resolved earlier. This way a feedback loop with a positive impact appears both for developers and the processing system as a whole.

The logic and process flows depicted in the figures and described herein are not limited to a particular order or sequence unless expressly stated. In addition, other steps may be provided, or steps may be eliminated, from the described flows, and other components may be added to, or removed from, the described systems.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A processing system configured to perform software test breakage detection, the processing system comprising:
   a processing module including one or more processors;
   a memory module configured to store data and instructions for execution by the one or more processors of the processing module, the memory module being configured to maintain a representation of recent test history for each combination of a test and build flags with which the test was built, wherein the recent test history includes both presubmit results of presubmit tests for pending changes and postsubmit results of postsubmit tests for submitted changes, wherein each presubmit result and each postsubmit result is associated with a change list identifier, and wherein each change list identifier is associated with a submitted change; and
   a communication module configured for communication with one or more remote devices including a test automation platform server;
   wherein the processing module is operatively coupled to the memory module and the communication module, and the processing module is configured to:
      receive at least one of a new postsubmit result or a new presubmit result from the test automation platform server;
      insert the least one of the new postsubmit result or the new presubmit result into the recent test history;
      evaluate the recent test history including the inserted at least one of the new postsubmit result or the new presubmit result by obtaining a set of change list identifiers that affected the test from the memory module and assessing a last known postsubmit state of the test to determine a cause of a breakage of the test, wherein the cause of the breakage of the test is determined at least in part from one or more presubmit results included in the recent test history; and
   in response to the evaluation, instruct a test automation platform rescheduler to reschedule the test for a set of change list identifiers associated with the cause of the breakage.

2. The processing system of claim 1, wherein the last known postsubmit state of the test is one of: no results known, currently passing, currently failing, or currently broken.

3. The processing system of claim 1, wherein the evaluation by the processing module includes retaining, for further analysis, only a latest result from each unsubmitted change.

4. The processing system of claim 3, wherein the evaluation by the processing module further includes rounding down a base change list number of each unsubmitted change to a number of a previous change that affected the test.

5. The processing system of claim 1, wherein the processing module is configured to instruct the test automation platform rescheduler to reschedule the test by:
   scheduling one test run at a latest change that affected the test;
   scheduling test runs at all changes after a given change with a last known postsubmit result; or
   scheduling one or more test runs in a range between a last change at which the test passed on presubmit or on postsubmit, and a first change at which the test failed on presubmit.

6. The processing system of claim 1, wherein when a latest known postsubmit state is currently failing or currently broken and there is no identified culprit of the breakage, the processing module is configured to use stored presubmit results to determine a range of changes to indicate a culprit of the breakage.

7. The processing system of claim 1, wherein:
   when a latest known postsubmit state is currently passing, the processing module is configured to analyze stored presubmit results; and
   when there is a selected number of currently failing or currently broken presubmit results having a base changelist number greater than a base changelist number of a latest known postsubmit result, the processing module is configured to instruct the test automation platform server to reschedule the test in order to detect a culprit of the breakage.

8. The processing system of claim 1, wherein the memory module includes an in-memory grid configured to maintain the representation of recent test history for each combination of a test and build flags with which the test was built.

9. The processing system of claim 8, wherein the processing module is configured to instantiate one or more in-memory grid server elements for the in-memory grid, one or more instances of a dashboard user interface for presentation of test information to a user, and a presubmit rescheduler configured to instruct the test automation platform rescheduler to reschedule the test.

10. The processing system of claim 8, wherein the in-memory grid is arranged so that each data point is stored in 8 bytes.

11. The processing system of claim 8, wherein the in-memory grid is configured as an array of shards.

12. A computer-implemented method for performing software test breakage detection, the method comprising:
   receiving, by one or more processors of a processing system, at least one of a new postsubmit result or a new presubmit result from a test automation platform server;
   inserting, by the one or more processors, the at least one of the new postsubmit result or the new presubmit result into memory of the processing system, the memory being configured to maintain a representation of recent test history for each combination of a test and build flags with which the test was built, the recent test history including both presubmit results of presubmit tests for pending changes and postsubmit results of postsubmit tests for submitted changes, wherein each presubmit result and each postsubmit result is associated with a change list identifier, and wherein each change list identifier is associated with a submitted change;

evaluating, by the one or more processors, the recent test history including the at least one of the new postsubmit result or the new presubmit result inserted into the recent test history by obtaining a set of change list identifiers that affected the test from the memory module and assessing a last known postsubmit state of the test to determine a cause of a breakage of the test, wherein the cause of the breakage of the test is determined at least in part from one or more presubmit results included in the recent test history; and in response to the evaluation, the one or more processors instructing a test automation platform rescheduler to reschedule the test for a set of change list identifiers associated with the cause of the breakage.

13. The computer-implemented method of claim 12, wherein the evaluating further includes rounding down a base change list number of each unsubmitted change to a number of a previous change that affected the test.

14. The computer-implemented method of claim 12, wherein the instructing to reschedule the test includes instructing the test automation platform reschedule to perform:

scheduling one test run at a latest change that affected the test;

scheduling test runs at all changes after a given change with a last known postsubmit result; or scheduling one or more test runs in a range between a last change at which the test passed on presubmit or on postsubmit, and a first change at which the test failed on presubmit.

15. The computer-implemented method of claim 12, wherein when a latest known postsubmit state is currently failing or currently broken and there is no identified culprit of the breakage, the method includes using stored presubmit results to determine a range of changes to indicate a culprit of the breakage.

16. The computer-implemented method of claim 12, wherein the method includes:

analyzing stored presubmit results when a latest known postsubmit state is currently passing; and when there is a selected number of currently failing or currently broken presubmit results having a base changelist number greater than a base changelist number of a latest known postsubmit result, instructing the test automation platform server to reschedule the test in order to detect a culprit of the breakage.

17. A non-transitory computer-readable recording medium having instructions stored thereon, the instructions, when executed by one or more processors, causing the one or more processors to perform a method for performing software test breakage detection, the method comprising:

receiving at least one of a new postsubmit result or a new presubmit result from a test automation platform server;

inserting the at least one of the new postsubmit result or the new presubmit result into memory associated with the one or more processors, the memory being configured to maintain a representation of recent test history for each combination of a test and build flags with which the test was built, wherein the recent test history includes both presubmit results of presubmit tests for pending changes and postsubmit results of postsubmit tests for submitted changes, wherein each presubmit result and each postsubmit result is associated with a change list identifier, and wherein each change list identifier is associated with a submitted change;

evaluating the recent test history including the at least one of the new postsubmit result or the new presubmit result inserted into the recent test history by obtaining a set of change list identifiers that affected the test from the memory module and assessing a last known postsubmit state of the test to determine a cause of a breakage of the test, wherein the cause of the breakage of the test is determined at least in part from one or more presubmit results included in the recent test history; and in response to the evaluation, instructing a test automation platform rescheduler to reschedule the test for a set of change list identifiers associated with the cause of the breakage.

18. The non-transitory computer-readable recording medium of claim 17, wherein when a latest known postsubmit state is currently failing or currently broken and there is no identified culprit of the breakage, the method includes using stored presubmit results to determine a range of changes to indicate a culprit of the breakage.

* * * * *